(No Model.) 3 Sheets—Sheet 1.
E. W. SCOTT.
BICYCLE.
No. 525,724. Patented Sept. 11, 1894.
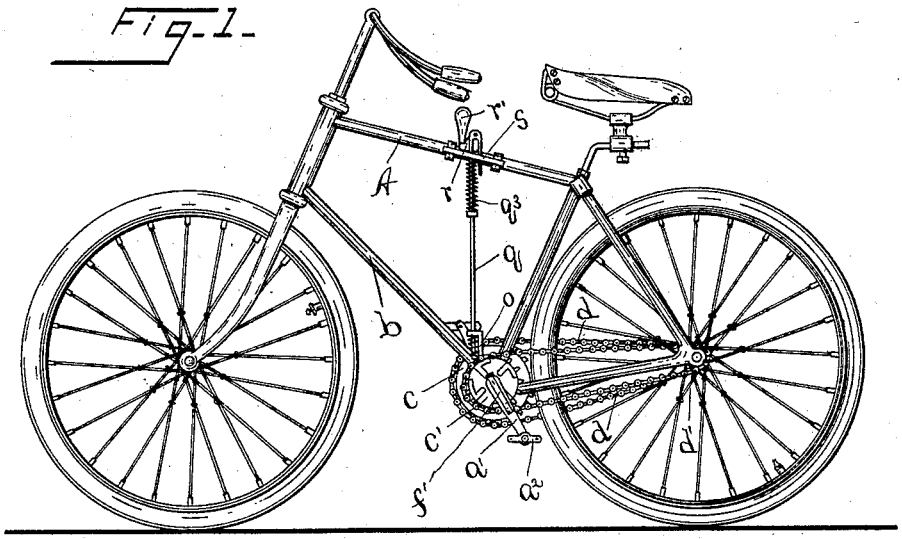
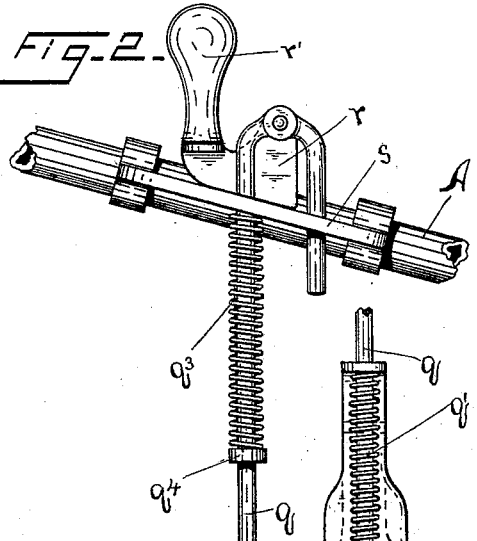
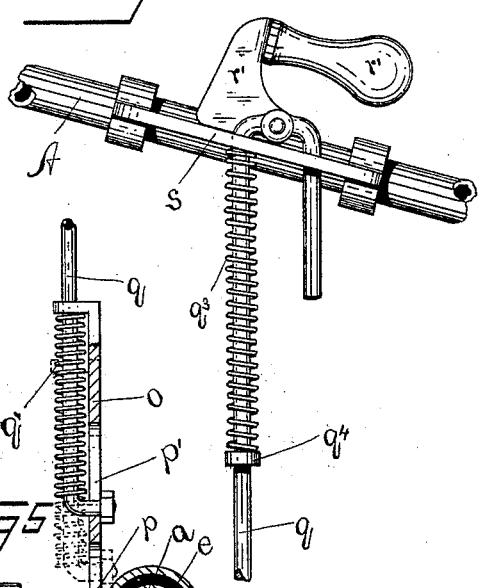
Witnesses
Alonzo M. Luther.
Edwin C. Johnson 2nd.
Inventor
Erastus W. Scott.
By Attorney
Frank H. Allen
THE NORRIS PETERS CO., PHOTO-LITHO., WASHINGTON, D. C.

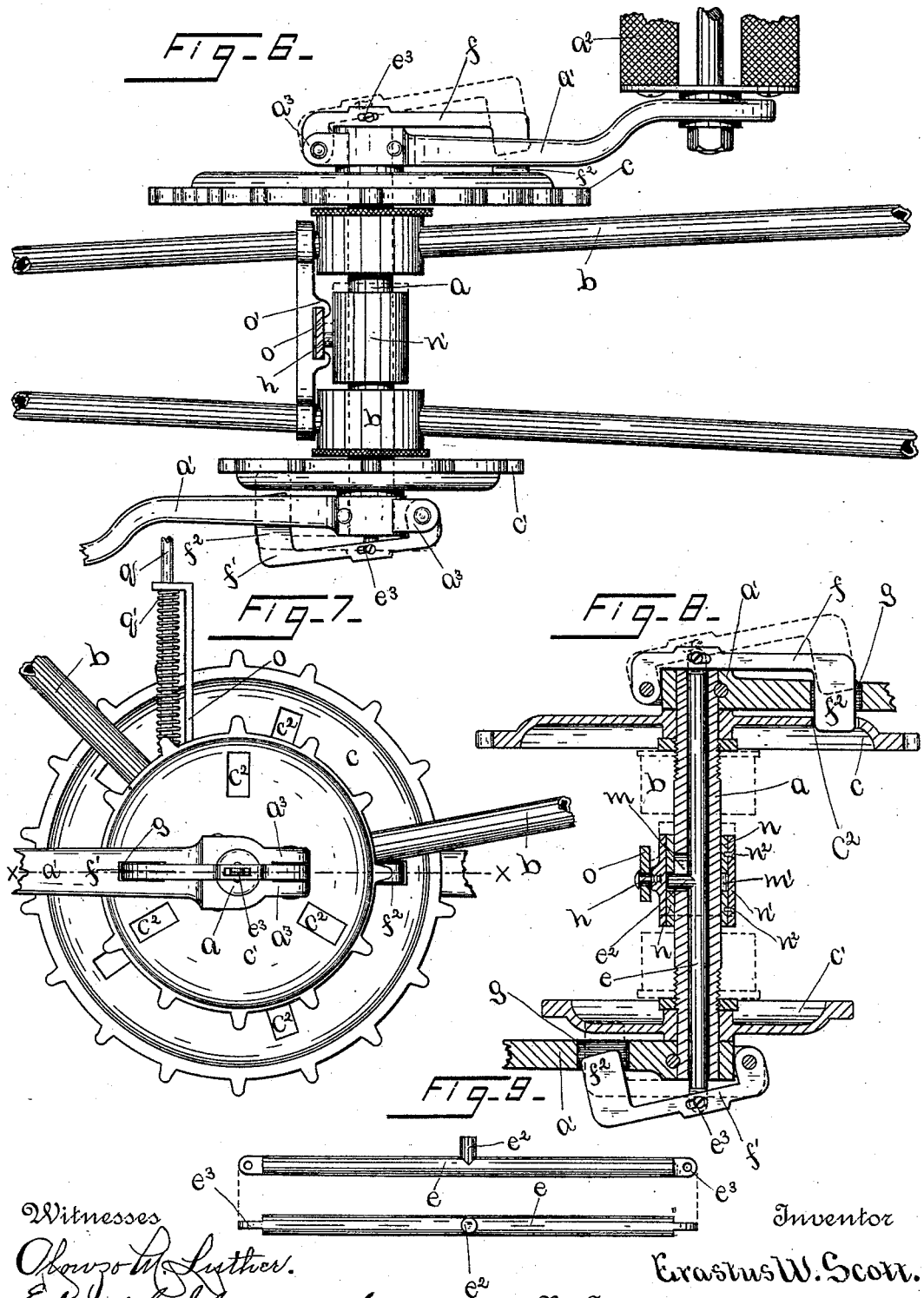

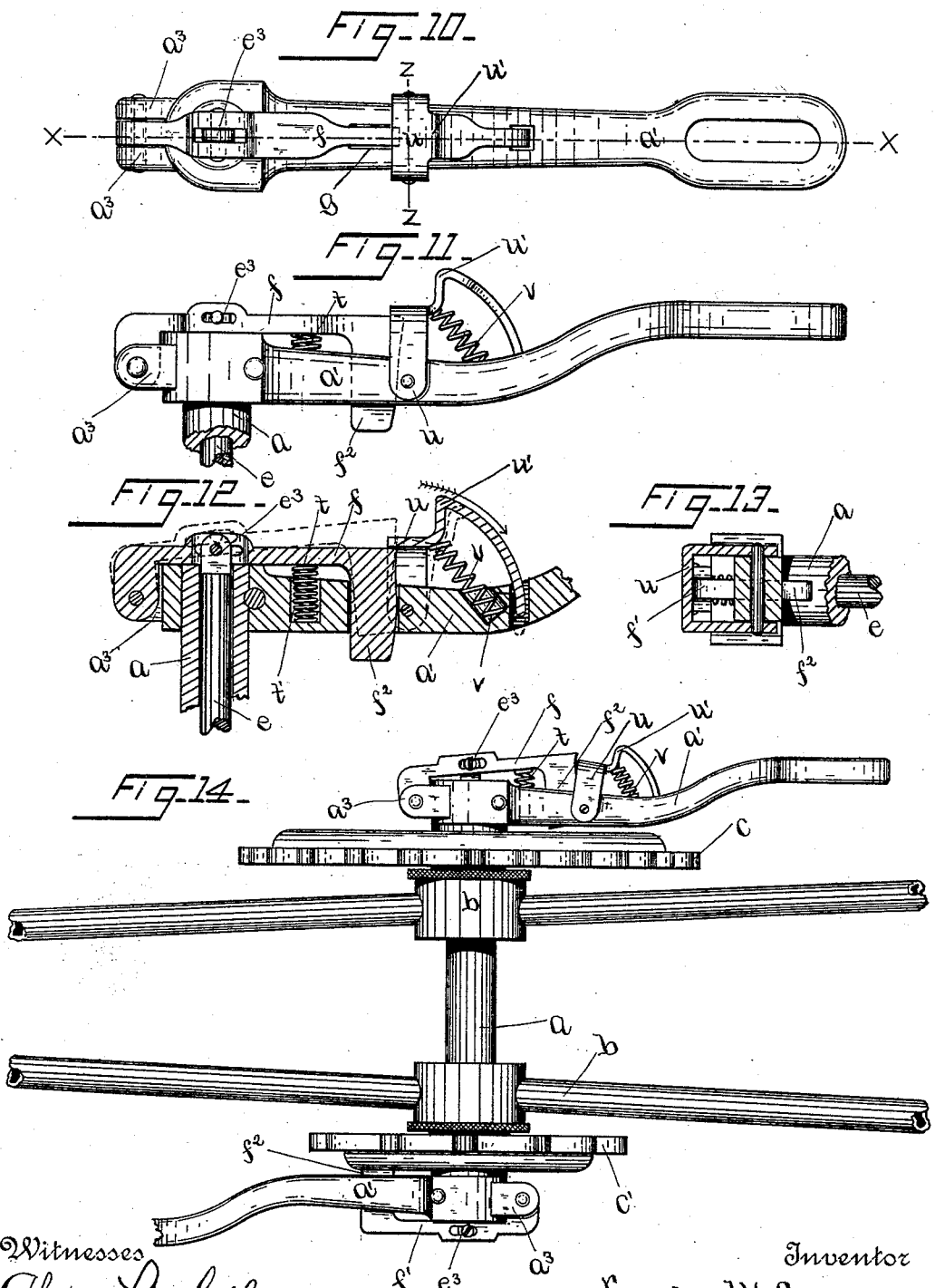

UNITED STATES PATENT OFFICE.

ERASTUS W. SCOTT, OF DANIELSONVILLE, CONNECTICUT.

BICYCLE.

SPECIFICATION forming part of Letters Patent No. 525,724, dated September 11, 1894.

Application filed October 30, 1893. Serial No. 489,553. (No model.)

*To all whom it may concern:*

Be it known that I, ERASTUS W. SCOTT, a citizen of the United States, residing at Danielsonville, Windham county, State of Connecticut, have invented certain new and useful Improvements in Bicycles, which improvements are fully set forth and described in the following specification, reference being had to the accompanying three sheets of drawings.

On the 25th day of April, 1893, Letters Patent of the United States, numbered 496,007, were issued to me for an improvement in bicycles of the class in which driving mechanism is employed consisting of a chain connecting a sprocket-wheel on an independent crank-shaft, with a similar sprocket-wheel secured to the axial shaft of one of the 'cycle wheels, the object of which invention was to produce a bicycle provided with a system of driving mechanism, so constructed that great speed or high power might be brought into use at the will of the rider of the machine whenever necessary, or desirable. A bicycle so constructed is especially valuable for use in what is termed "road riding" the rider being able without dismounting (by use of mechanism provided therefor) to bring into use great power while traversing hilly or sandy districts where speed is not desirable or, per contra, to bring into use high speed on level or hard roads. In order to produce these desirable results it was necessary, as shown in my said earlier patent, to provide two separate driving sprockets, suitably mounted upon the crank shaft, each provided with a chain passing rearward and, under proper conditions, imparting motion to its individual sprocket fixedly secured to the axle of the rear bicycle wheel in the usual manner. The driving sprockets are of different sizes the larger of which, when in use, will impart high speed to the machine, as readily understood, and the companion driving sprocket, being considerably smaller will, when in use, give great power.

My present invention is in this class of bicycles and its object is to provide new and simpler means for bringing into use the particular sprocket required to produce power or speed, as may be desired, and to assist in explaining the same I have provided the accompanying drawings.

In the drawings Figure 1 is a side elevation of a bicycle embodying my improvements. Fig. 2 is an elevation of the upper portion of a certain operating rod, and its attached parts, hereinafter fully described and Fig. 3 is a view similar to Fig. 2 but shows changed somewhat the positions of the several parts illustrated. Fig. 4 is an elevation of the lower portion and attached parts of the just mentioned operating rod and Fig 5 is a view showing, principally in vertical section, the several parts illustrated in Fig. 4. Fig. 6 is an enlarged plan view of the driving mechanism of a bicycle equipped with my newly improved device. Fig. 7 is a side elevation of the parts illustrated in Fig. 6. Fig. 8 is a view principally in section, taken on line $x$—$x$ of Fig. 7. Fig. 9 embraces side and top views of a certain shipper-rod hereinafter described. Figs. 10, 11, 12, 13 and 14 illustrate a modification of my device, Fig. 10 being a front elevation of one crank arm showing properly located and assembled thereon several elements used in operating my improved clutch shifting mechanism. Fig. 11 is a side elevation of the parts illustrated in Fig. 10. Figs. 12 and 13 are sectional views taken on lines $x$—$x$ and $z$—$z$ respectively, of Fig. 10. Fig. 14 is a view similar to Fig. 6 and shows the driving and clutch mechanisms of a machine fully equipped with the modified form of my invention.

Referring to the drawings, the letter $a$ denotes the crank-shaft of a bicycle, suitably supported in bearings in the machine frame $b$, which crank-shaft bears on each end on crank-arms $a'$, secured thereto in the usual manner and bearing on their free ends pedals $a^2$.

Loosely mounted on the crank-shaft $a$, adjacent to each crank-arm $a'$, is a sprocket-wheel, said wheels being lettered respectively $c$ and $c'$ and certain clutch mechanism hereinafter described is provided, whereby either of said wheels may be so locked as to turn with said shaft, the nature of said mechanism being such that one of said sprockets will at all times be locked to and revolve with shaft $a$, the companion sprocket during this time running idly on the shaft.

It will be seen by reference to the drawings that sprockets $c$ and $c'$ are not of the same size, the former being considerably larger than the latter. Each is provided with a driving chain $d$ through which motion is imparted to its individual small sprocket $d'$ fixedly secured to the axle of the rear or driving wheel of the bicycle, in the usual manner, as illustrated in Fig. 1. Should sprocket $c$ be locked to turn with shaft $a$ and motion be imparted therefrom through its chain $d$ to its small sprocket $d'$ great speed of the driving wheel will be attained for the reason that the sprocket $d'$, being much smaller than its driver $c$, will make several revolutions to one of the latter. During such time the sprocket $c'$ will run idly on shaft $a$, motion being imparted to said sprocket $c'$ through its chain $d$ which will be driven by its revolving sprocket $d'$ fixedly secured to the axle of the rear bicycle wheel. On the other hand should the sprocket $c$ be released from shaft $a$ and sprocket $c'$ locked to turn therewith said sprocket $c'$ being much smaller than sprocket $c$ will slow down the speed of the axle of the rear wheel, for the reason that the driving sprocket $c'$ is more nearly of the size of its companion $d'$. The sprocket $c$, during such time, revolves idly on shaft $a$, motion being imparted thereto, through chain $d$ from its sprocket $d'$.

It will be readily understood from the above explanation that sprocket $c$ when in use imparts high speed and sprocket $c'$ slower speed and great power to the bicycle.

Having now described the office of the sprockets $c$—$c'$ I will proceed to describe the mechanism for locking them to, or releasing them from, the shaft $a$, at the proper time to bring into play either sprocket desired, which mechanism, and means for operating the same, form the essential features of my present invention.

Shaft $a$ has a hole bored throughout its entire length of a size sufficient to permit a rod $e$ (detached views of which are shown in Fig. 9) to slide freely therein, the rod $e$ being slightly longer than the shaft $a$.

The enlarged or hub end of each crank arm $a'$ is provided with projections or ears $a^3$ between which is hinged one end of what I term a latch, that one near sprocket $c$ being lettered $f$ and the opposite one $f'$. The free ends of these latches are turned inward substantially in hook-shape as shown, such hooked portion being lettered $f^2$. An opening $g$ is cut through each arm $a'$ at the proper point to permit of the hooked end of the latch entering therethrough, for a purpose to be explained. As above mentioned the rod $e$ is somewhat longer than the shaft $a$. The projecting ends of this rod are milled transversely and drilled as at $e^3$ providing eyes by means of which the ends of said rod are secured in slots cut at the proper point in latches $f$ and $f'$ respectively, as illustrated in the drawings. When latches $f$ and $f'$ are thus connected by rod $e$, longitudinal movement of the rod will cause said latches to be moved in unison, one being swung outward as the other is drawn inward.

The sprockets $c$ and $c'$ are each provided with a number of openings $c^2$, so located that the hooked end of latch $f$ or $f'$, as the case may be, when drawn inward, will enter one of the holes $c^2$ in their respective sprockets $c$—$c'$, these hooked ends being sufficiently long to easily enter these openings, as shown in the drawings.

Assuming that shaft $a$ is provided with the crank-arms $a'$, that latches $f$ and $f'$ are connected by rod $e$ as shown and that sprockets $c$—$c'$ are loosely mounted on said shaft in the manner shown and described; should latches $f$ and $f'$ be in the positions shown in full lines in Fig. 8 it will be seen that the hooked end of latch $f$ enters the opening $g$ of its crank-arm $a'$ and that the end of hooked portion $f^2$ lies in one of the openings $c^2$ of the sprocket $c$. When the parts are thus in position the sprocket $c$ is securely locked to its crank arm and consequently will turn with the shaft $a$. Meanwhile the sprocket $c'$ is free to run idly on said shaft $a$. Should rod $e$ be slid toward sprocket $c$ the hooked end of latch $f$ will be withdrawn from the opening $c^2$ of sprocket $c$ and the latch $f'$ will at the same time be drawn toward its sprocket $c'$ the hooked end $f^2$ of said latch $f'$ entering the first opening $c^2$ in sprocket $c'$ with which it becomes coincident. The above parts then assume the respective positions shown in dotted lines in Figs. 6 and 8 and in full lines in Fig. 14, the sprocket $c'$ now being locked to its crank arm $a'$ and consequently turning with the shaft $a$, the sprocket $c$ meanwhile running idly.

Having now fully described the mechanism employed for bringing into use either of the sprockets $c$—$c'$, as may be desired, I will proceed to describe the means provided for operating this shift mechanism. To accomplish this I have illustrated and will describe two separate methods either of which may be applied to a machine fitted up with my improved driving mechanism; the first of which methods is illustrated in Figs. 1 to 9 and is operated by hand, the second method being shown in Figs. 10 to 14 and is operated by foot.

When it is desired to equip a machine with the first mentioned mechanism, for operating sliding rod $e$ by hand, it is necessary to cut in shaft $a$ a slot $m$ extending parallel to the length of said shaft and of a length slightly greater than the extent of movement it is desired to impart to rod $e$. A stud $e^2$ is formed on rod $e$, extending outward through said slot $m$, the end of said stud lying in an annular groove $m'$ in a peculiarly constructed sleeve mounted, as shown, on shaft $a$. This sleeve is composed of two cylindrical collars $n$ which fit around shaft $a$ and are caused to always maintain the same position, relative to each other, by means of a cylindrical shell $n'$ to which they are secured by pins or screws $n^2$.

It will be seen by reference to Fig. 8 that the sleeves or collars $n$ are placed sufficiently far apart to permit of the insertion between them of the stud $e^2$, thereby forming the annular groove $m'$ above referred to on the inner side of the outer shell. It will also be seen that the stud $e^2$, when the shaft $a$ is in revolution, will travel around in the groove $m'$ and that if the sleeve is moved longitudinally on shaft $a$, the rod $e$ will be correspondingly moved.

Longitudinal movement may be imparted to the said sleeve $n'$ by means of a plate $o$ having a limited vertical movement in suitable ways $o'$ fixedly secured to the machine frame. The vertically movable plate $o$ is best seen in Figs. 4 and 5 in which views it is shown in full lines in its highest position and in dotted lines in its lowest position. The sleeve $n'$ is provided with a stud $h$ which stud lies in a diagonal groove $p$ cut in the plate $o$. When plate $o$ is forced downward the stud $h$ will ride upward and the connected sleeve $n'$ will be moved laterally a distance equal to the pitch of the diagonal groove $p$ (see dotted lines in Fig. 4). Movement thus imparted to sleeve $n'$ is at once (through rod $e$) imparted to latches $f$ and $f'$ as already explained. When plate $o$ is again drawn upward the stud $h$ and sleeve $n'$ are slid in the opposite direction taking the positions shown in full lines in Fig. 4. The upper portion of plate $o$ is shown as bent at right angles to the main plate, providing a bearing through which operating rod $q$ of my device passes. The lower end of rod $q$ is also bent at right angles to its length which bent portion lies in a vertical goove $p'$ cut in plate $o$. A spiral spring $q'$ is introduced between this bent portion of rod $q$ and the upper portion of plate $o$ for a purpose hereinafter explained.

To the upper rod A of the bicycle frame, is secured a plate $s$ through which plate the rod $q$ passes, said plate providing an upper bearing therefor in alignment with its bearing in the upper portion of plate $o$. The upper portion of rod $q$ may be turned and bent back parallel with itself, such parallel portion being also provided with a bearing in plate $s$ as shown, this construction preventing in a measure any twisting or displacement of the rod $q$. To the upper portion of rod $q$ is pivotally connected a triangularly shaped piece $r$ provided with a handle $r'$. When this piece $r$ is in the position shown in Fig. 2 it will be seen that the rod $q$ is in its highest position, but should piece $r$ be turned over by means of its handle, (see Fig. 3) it will be easily seen that rod $q$ will be allowed to drop to its lowest position. A spring $q^3$ encircles rod $q$, one end of which spring abuts the under side of plate $s$ and the other end a collar $q^4$ secured to rod $q$. This spring acts with a constant tendency (by expansion) to hold in its lowest position the rod $q$ but from the peculiar shape of piece $r$ it will be seen that the rod $q$ pivoted thereto will always maintain the position to which it is adjusted.

Should rod $q$ be moved either upward or downward it will under ordinary circumstances carry with it plate $o$ and thereby slide the sleeve $h$ as already explained. The spring $q'$ is sufficiently stiff to prevent the bent portion of the rod $q$ from traveling in the slot $p'$. Should it happen however that when rod $q$ is drawn upward the sleeve $n'$ does not readily slide (by reason of the failure of the latch to readily lock with its sprocket) the bent end of rod $q$ will for an instant ride upward in the slot $p'$ but as soon as the said latch enters a hole $c^2$ the spring $q'$ will at once force plate $o$ upward thus sliding sleeve $n'$ and the connected latches $f$ and $f'$.

Should the shifting mechanism just described be applied to a machine it will be seen that when it is desired to bring into use the idle sprocket to change from speed to power or, vice versa, it is simply necessary to grasp handle $r'$ to raise or lower (as the case may require) rod $q$ and its connected plate $o$, thereby sliding sleeve $n'$ to produce the desired change.

I will now proceed to describe another system of mechanism by means of which the rod $e$ may be shunted from side to side by foot instead of by hand. When operated by foot it is unnecessary to provide the stud $e^2$ of rod $e$ said stud and its connection (sleeve $n'$, &c.,) being done away with. To accomplish the desired result one of the crank-arms (here shown as the right hand one when the machine is assembled) is fitted up in the following manner: A spring $t$ is introduced between the latch $f$ and the crank-arm $a'$ said spring being seated in a hole $t'$ provided therefor in the crank arm $a'$ (see Fig. 12). This spring $t$ acts with a constant tendency to throw latch $f$ outward and away from its crank-arm. The crank-arm also bears thereon what I term a "catch" $u$, the shape of the same being clearly shown in the drawings (see especially Figs. 10, 11 and 13) the same being substantially that of an inverted letter "U," the downwardly projecting portions of which are pivoted to the sides of the crank arm as shown. A projection $u'$ is also formed on this catch $u$, of the form illustrated, and for a purpose hereinafter explained.

A spring $v$ bears against the catch $u$ with a constant tendency to rock the same forward on its pivot, toward the shaft $a$, spring $v$ being seated in a hole in a manner similar to spring $t$. The catch $u$ is so located relative to the latch $f$, that when said catch is in its upright position the end of said latch lies beneath the catch and is locked in engagement with its sprocket. When said catch is tipped backward as shown in dotted lines in Fig. 12, and in full lines in Fig. 14, it will be seen that latch $f$ will be released and spring $t$ will at once force said latch outward, releasing its free end from the sprocket and simultaneously, through rod $e$, the companion latch will be drawn inward into engagement with its sprocket.

Assuming that I have a shifting mechanism as just described and the various parts are in the positions shown in Fig. 14, with the latch $f'$ in engagement with the sprocket $c'$, if it is desired by the rider to bring into play the sprocket $c$ he simply presses inward with his foot the latch $f$ which as before explained enters the first opening $c^2$ in its sprocket with which it becomes coincident. When latch $f$ is pressed inward catch $u$, impelled by its spring $v$, at once swings forward over the latch $f$ as shown in Fig. 12 and holds the said latch in engagement with its sprocket. When it is desired to again bring into use the sprocket $c'$ the rider simply presses the catch $u$ (his foot pushing against the projection $u'$) in the direction indicated by the arrow in Fig. 12 and latch $f$, upon being thus released, will at once spring forward impelled by its spring $t$. It should be remembered that the latches $f$ and $f'$ in this last form of shifting mechanism, work in unison, in the same manner as first described in connection with the hand rod $q$, and that when one of said latches is in engagement with its sprocket wheel the other is released.

Assuming that I have a bicycle properly fitted up with the described driving and shifting mechanism for actuating the same and either of the described means for operating said mechanism, should a rider of a machine so equipped when riding at high speed come upon a sandy or hilly stretch of road it is only necessary, by use of the described means, to bring into use the power mechanism whereby, without great exertion, he is able to ride through such sandy portion of road or to mount a hill of any ordinary grade. My invention adds but little to the cost and weight of a 'cycle and is of great convenience.

Having fully described my invention, I claim—

1. The combination, in a cycle, with duplicate sets of driving mechanism, constructed to drive at different speeds, of latches, each pivoted to a crank at one end and having its other end arranged to engage the adjacent driving mechanism to make the same operative, and a laterally shiftable rod, having its extremities pivoted directly to the parts of said latches intermediate of the ends thereof, and serving, when shifted, simultaneously to throw one latch into and the other latch out of engagement with their respective driving mechanisms, substantially as described and for the purposes specified.

2. In combination, driving mechanism for a cycle, consisting of a duplicate system of sprocket-wheels and chains as set forth, shift mechanism for the same consisting of clutches hinged to the cranks and whose free ends may be swung into locking engagement with their respective sprocket-wheels, a rod connecting said clutches, a spring for forcing said shift mechanism normally in one direction and means for locking the same in the opposite direction, substantially as specified.

3. In combination, driving mechanism for a cycle consisting of a duplicate system of sprocket-wheels and chains as set forth, shift mechanism for the same consisting of clutches hinged to the cranks and whose free ends may be swung into locking engagement with their respective sprocket-wheels, a rod connecting said clutches, a spring for forcing said shift mechanism in one direction and a latch for locking the same in the opposite direction, said latch being hinged to one of the cycle crank-arms, within reach of the rider's foot, substantially as specified.

4. The combination, in a cycle, with the driving and crank shafts, a duplicate system of sprocket wheels and chains, constructed to drive at different speeds, the sprocket wheels on the crank shafts being loosely mounted, and the cranks, of latches, each pivoted at one end to a crank and having its other end adapted to engage an adjacent sprocket wheel, and a shiftable rod, extending through said crank shaft and secured at its ends to said latches, substantially as described and for the purposes specified.

5. The combination, in a cycle, with the driving and crank shafts, and a duplicate system of sprocket wheels and chains connecting said shafts and adapted to drive at different speeds, the sprocket wheels on the crank shaft having openings and being loosely mounted, of the cranks, a rod extending through said crank shaft, latches each pivoted at one end to a crank and having its other end bent inward and designed to engage any one of the openings in the adjacent sprocket, said latches being secured intermediate of their ends to the ends of said rod, and means for shifting said rod, substantially as described and for the purposes specified.

6. The combination, in a cycle, with the driving and crank shafts, and a duplicate system of sprocket wheels and chains connecting said shafts and adapted to drive at different speeds, of the cranks, connected latches pivoted to said cranks, a pivoted catch for each of said latches, said catch being operated by the foot of the rider, and means for forcing said latches out of engagement with their respective sprockets when the catches are disengaged from them, substantially as described and for the purposes specified.

7. The combination, in a cycle, with the driving and crank shafts, and a duplicate system of sprocket wheels and chains connecting said shafts and adapted to drive at different speeds, of the cranks, pivoted spring-pressed latches arranged to engage the sprockets on the crank shaft and to lock them to their shaft, a rod connecting said latches, so that as one is thrown into engagement with its sprocket the other will be thrown out of engagement with its sprocket, and a pivoted catch for each of said latches, said catches being operated by the foot of the rider and serving, when engaged with their respective latches, to hold the same in engagement with its sprocket, substantially as described.

8. The combination, in a cycle, with the driving and crank shafts, sprockets loosely mounted on the crank shaft, sprockets on the driving shaft, chains connecting said sprockets, said sprockets and chains being arranged to form two sets of driving connections adapted to drive at different speeds, and the cranks, of connected spring-pressed latches pivoted to said cranks and adapted to make one of the driving connections operative and the other inoperative simultaneously, and spring pressed catches pivoted to said cranks and adapted to be operated by the foot of the rider, in the manner and for the purposes specified.

ERASTUS W. SCOTT.

Witnesses:
 ARTHUR GRILL,
 CLARA J. YOUNG.